United States Patent [19]

Stocchiero

[11] Patent Number: 5,498,488
[45] Date of Patent: Mar. 12, 1996

[54] CONTAINER FOR RAPID CHARGE ACCUMULATOR HAVING CHANNELS MOLDED IN THE LID FOR DISTRIBUTING THE ELECTROLYTE

[76] Inventor: Olimpio Stocchiero, via Kennedy, 4 - 36050 Montorso Vicentino (VI), Italy

[21] Appl. No.: 374,704

[22] PCT Filed: Jun. 6, 1994

[86] PCT No.: PCT/EP94/01823

§ 371 Date: Jan. 25, 1995

§ 102(e) Date: Jan. 25, 1995

[87] PCT Pub. No.: WO94/29907

PCT Pub. Date: Dec. 22, 1994

[30] Foreign Application Priority Data

Jun. 9, 1993 [IT] Italy ................................. VI93A0099

[51] Int. Cl.[6] ................................................. H01M 2/36
[52] U.S. Cl. ..................... 429/72; 429/82; 429/175; 429/176
[58] Field of Search ..................... 429/63, 64, 72, 429/73, 74, 80, 88, 82, 176, 175

[56] References Cited

U.S. PATENT DOCUMENTS 2,678,344  5/1954  Strohlein et al. .
3,740,272  6/1973  Blaich et al. ........................ 429/63
3,871,923  3/1975  Ikeda .................................. 429/64
4,087,592  5/1978  Okazaki et al. .
4,353,968  10/1982  Boyle .................................. 429/64

FOREIGN PATENT DOCUMENTS 2340624  2/1977  France .
2517497  10/1976  Germany .

OTHER PUBLICATIONS

Yuasa Denchi K.K., Storage Battery, vol. 9 No. 189 (E–333) [1912] Aug. 6, 1985 (60–56364 Abstract).

Primary Examiner—Anthony Skapars
Attorney, Agent, or Firm—Watson, Cole, Grindle & Watson

[57] ABSTRACT

The invention discloses an accumulator container comprising a box (2) presenting one or more element-containing cells (3), each of said cells presenting at least one tube (5) for the inlet of the electrolyte. Said tube (5) has one end connected with an opening (6) made in the lid and its other end arranged near the bottom of the container. Said box presents a lid having at least one first inlet opening (6), connected through channels (71, 72, 73, 74, 75, 76) for the distribution of the electrolyte with electrolyte inletting tubes (5, 51), found in the box and in the lid, and at least one second outlet opening (11) connected with level tubes (81), each belonging to each cell.

9 Claims, 2 Drawing Sheets

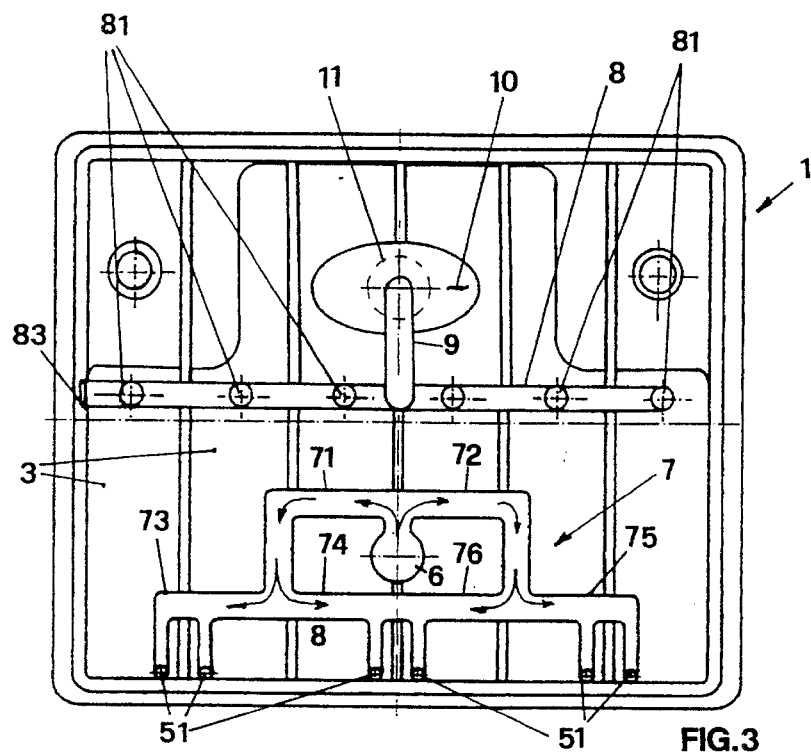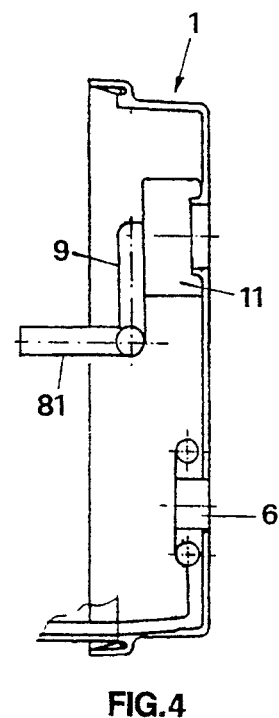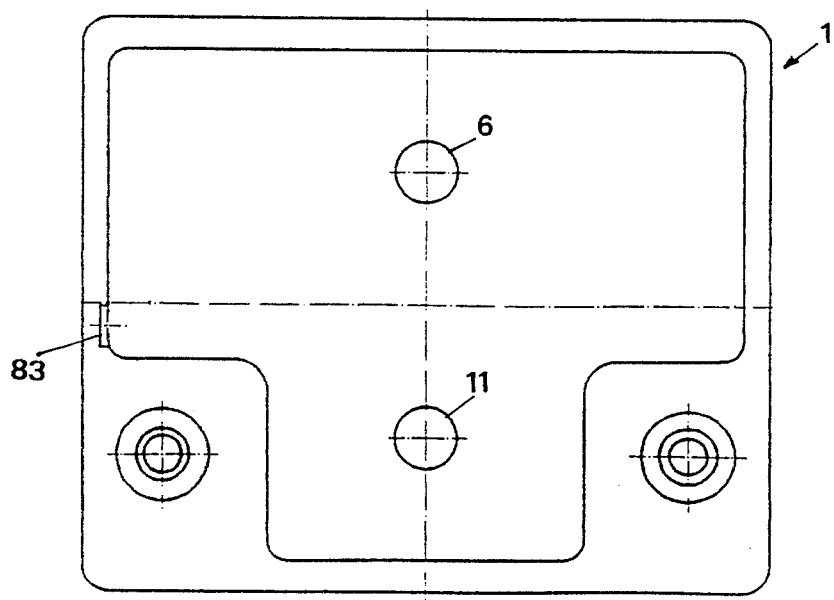
FIG.3
FIG.4
FIG.2

CONTAINER FOR RAPID CHARGE ACCUMULATOR HAVING CHANNELS MOLDED IN THE LID FOR DISTRIBUTING THE ELECTROLYTE

BACKGROUND OF THE INVENTION

1. Field of the Invention

The invention concerns a container especially suitable for accumulators that need be charged in a short time.

2. General State of the Art

According to some known techniques, some time ago the first charge of the accumulators was achieved by static immersion of the electrolyte in the container, while the same did not circulate. This technique required a very long charging time, sometimes exceeding 24 hours.

Some more recent techniques, such as the one according to the dictates of the Swedish patent application 770184-9 in the name of the YUASA BATTERY Company, which describe a special device for the rapid charge of the accumulators achieved through the use of a cap, suited to be applied to the mouth of a lid for the charge of the electrolyte, wherein the cap comprises an inlet tube and an output tube through which the electrolyte which pre-sets the charge of each accumulator cell enters and exits. The electrolyte which is forced to circulate inside the accumulator is then cooled outside of it, since during the charging process heat develops, and by cooling the electrolyte the charge efficiency is increased and the charging time is then considerably shortened. However, the use of special caps also causes defects in the circulation of the electrolyte itself, due to the clogging of the cap after repeated charges.

According to the Italian patent application No. VI93A000033 registered in the name of the same applicant of the present invention, an accumulator container allowing a rapid charge is proposed, wherein, in each cell of the container box at least one tube for the inlet of the electrolyte is foreseen, arranged at an essentially vertical position, and communicating with one opening made on the container lid, while its other end was arranged close to the bottom; at least one level tube, always for each cell of electrolyte, was also foreseen, said level tube had one end communicating with the opening made on the lid and the other one coinciding with the level of electrolyte which it was necessary to reach inside each cell.

According to a preferred embodiment of that invention, the level tubes are molded in the lid, while the tubes for the inlet of the electrolyte are partially molded in the lid for a first part, and the rest in the container box, and the two parts are joined together when the lid and the box are attached to each other.

Each cell is provided with an entrance for the inlet of the electrolyte and an exit for the same. The charge of the electrolyte is produced by causing the electrolyte to circulate inside each element or cell.

One of the inconveniences of the previously mentioned invention is that, in order to cause the circulation of the electrolyte in a battery and therefore to produce the first charge of a battery, it is necessary to use complex equipment presenting several connections for the inlet and several outcoming tubes for the circulation of the electrolyte itself.

SUMMARY OF THE INVENTION

One purpose of the present invention is that of simplifying the equipment to be used for the first charge of the electrolyte.

Another purpose is that of improving the quality of the charge of the battery, ensuring a perfect circulation of the electrolyte at an equal speed and equal amount for each cell, obtaining also a shorter charging time.

Not the last purpose is that of obtaining a container for batteries which has all the channels for distributing the electrolyte, as well as the level tubes of said electrolyte, molded on the lid. The same is true for the box which presents all the inlet tubes obtained during the molding process.

Finally, another proposed purpose is to obtain a lid presenting only two openings, one for feeding the electrolyte and one for the exit of the same during the circulation of the first charge, said lid being also usable for topping up.

All the purposes previously mentioned and others which will be better pointed out hereinafter, are achieved by means of an accumulator container made of plastic material, comprising:

a box presenting one or more cells suited to receive the elements forming the accumulator and which are immersed in the electrolyte, each of said cells presenting at least one tube for letting in the electrolyte for the first charge, arranged at an essentially vertical position, with one end communicating through ducts with an opening made in the lid, and with the other one arranged near the bottom of the box, characterized in that it presents a lid having at least one first opening for feeding the electrolyte connected with inlet tubes present in the box through channels for distributing the electrolyte, and at least one second outlet opening connected with level tubes, each belonging to each cell, each level tube communicating with said second opening with one end, while its opposite end terminates at the height of the level required in each cell.

According to a preferred embodiment said lid presents said channels for distributing the electrolyte running from the inlet opening to each vertical inlet tube found in the box, each channel having essentially the same length and essentially the same charge losses. Moreover, all the channels, the inlet and the level tubes are obtained by co-injection of nitrogen during the molding process.

Advantageously, according to the invention, channels, having the same length and such as to force the electrolyte to reach each inlet tube in the same amount and at the same speed, each channel having the same number of curves thus insuring the same charge losses, branch off from the first opening for the inlet of the electrolyte. In this way, each element belonging to each cell can be impregnated and can absorb the same quantity of electrolyte necessary for the charge of each cell.

Moreover, by eliminating at least partially the turbulent flow, a higher speed of the electrolyte circulating inside the accumulator is obtained, and as a consequence a reduction of the charging time is also achieved.

Moreover, according to another preferred embodiment of the invention, the second opening on the lid, that is the outlet opening, presents a collecting receptacle which can advantageously be used for the topping up operations with the purpose of ensuring the same level of electrolyte in all the cells.

Another possible embodiment is to provide the header connecting the various level tubes with an opening on the side of the lid itself, said opening being closed by a cap but being connectable with an external tube for removing exhaust fumes and steam from the electrolyte, when it becomes necessary to lead into the open the exhaust fumes produced by the battery during its operation or during the recharging operation.

BRIEF DESCRIPTION OF THE DRAWINGS

Further scope of applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description and from the drawings, wherein:

FIG. 2 is a top view of the lid according to the invention;

FIG. 3 shows a detail of the lid according to the invention emphasizing the channels for the distribution of the electrolyte;

FIG. 4 is a detail of FIG. 3 following the IV°—IV° line.

DESCRIPTION OF THE PREFERRED EMBODIMENT

Figure 1:
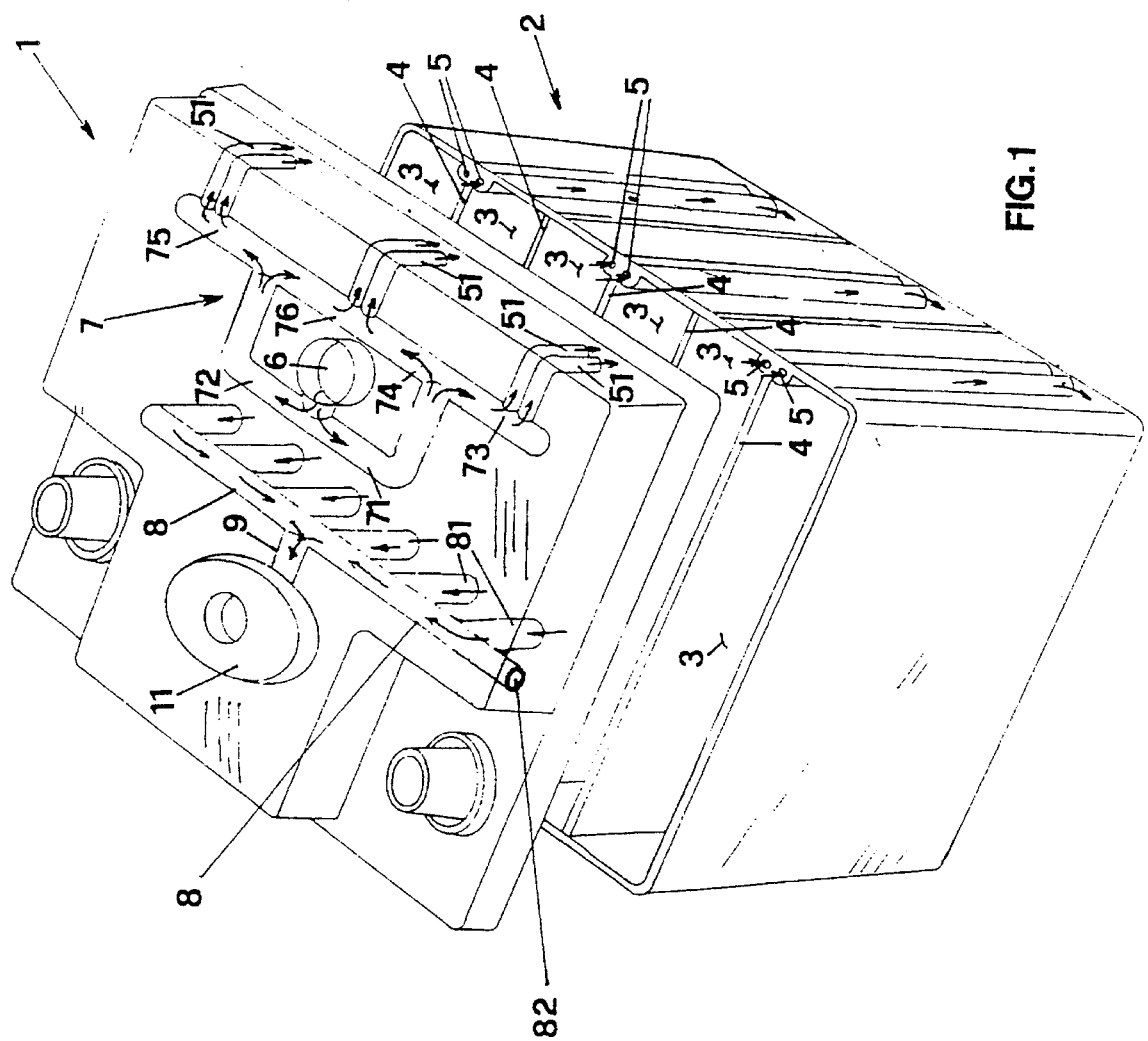
FIG. 1 shows the container according to the invention in a perspective view with the lid detached from the box.

With reference to the mentioned Figures, and especially to FIG. 1, it can be observed that the container according to the invention consists of a lid, indicated as a whole with 1, and of a box, indicated as a whole with 2. The box comprises a plurality of cells 3 separated by vertical partition walls 4. Each cell presents a vertical inlet tube 5 suited to let the electrolyte into the cell. On the upper part the inlet tube is bonded with the corresponding inlet tube found in the lid when lid 1 is attached to the box 2. The lower part of the tube 5 is slightly detached from the bottom so as to allow the circulation of the electrolyte during the operations of first charge. Advantageously, according to one embodiment of the invention, each inlet tube found in the box is obtained by molding process with a co-injection of nitrogen and it is molded in correspondence with the corner formed by the external wall of the box and the partition wall between one cell and the next.

According to a preferred embodiment of the invention, represented in FIG. 1, the channels are molded adjacent two by two.

The lid 1 presents an opening 6 which communicates with a labyrinth of channels, indicated as a whole with 7, also being obtained during the molding process with a co-injection of nitrogen. More precisely, two sections 71 and 72 branch off from opening 6 and after they have formed a 90° angle, each splits in two more branches, namely 73 and 74 for branch 71, and 75 and 76 for branch 72. In such a way the vertical sections 51 of the inlet channels belonging to the lid and which will be then connected with the inlet channels 5 by bonding or similar means, are fed with electrolyte which has an essentially identical run for each of the channels 51. It is evident that this arrangement insures a constant flow of electrolyte entering at the same speed and in equal amount into each of the inlet channels 51.

The electrolyte circulating in each cell 3 then comes out through the level channels 81, which are arranged in a vertical position and are all connected to a header 8 presenting an intermediate channel 9 connected with a collecting receptacle 10 communicating with an opening 11 belonging to the upper surface of the lid 1 and suited for evacuating the circulating electrolyte.

As pointed out, advantageously, the collecting receptacle 10 once the first charge of the battery has made, can be used as a topping up chamber during the life of the battery itself.

In fact, by inserting through the opening 11 the electrolyte needed for the refill, it can be easily understood that the electrolyte, which now circulates in the opposite direction as compared with the direction of circulation of the electrolyte of first charge, reaches the cells in a quantity sufficient to refill to the same level, since the tubes 81 have all the same length and therefore operate as level stabilizer.

It is well understood how, the invention achieves the proposed purpose, i.e., a battery container and in particular a lid which presents only two openings, 6 and 11, through which the electrolyte of the first charge can be made to enter through opening 6, circulate within the container and exit through opening 11. Then, through opening 11 the topping up of the battery can be easily carried out during the lifespan of the battery. The receptacle 10 also acts with advantage as an expansion receptacle for the electrolyte during the battery operation, by compensating for the volume increases of the electrolyte, caused by the heating of the battery.

According to the particular embodiment of the lid represented in FIGS. 1 and 3, the header 8 extends at least on one side until it reaches the opening 82 on the lateral surface of the lid, said opening being usually closed by cap 83.

In case it is necessary to convey outside the room where the battery operates the fumes developed by the battery during its operation or during its charge, cap 83 is removed and hole 82 is connected with an exhaust tube system for the conveyance of the fumes into the open air.

The same effect can be obtained by connecting the external tube systems with the upper hole 11 of lid 1. This can be done when the battery is positioned so as to allow some encumbrances over the lid.

It is then understood how all the proposed purposes are achieved, in particular the purpose of distributing the electrolyte with the highest rationality, effectiveness and regularity of distribution during the first charge, so as to obtain an essentially laminar flow of the electrolyte, at least for a certain stretch, and therefore to avoid as much as possible any turbulence which could leave some areas not equally charged. In addition, the equal courses obtained through the channels molded in the lid ensure that the same amount of electrolyte flows into each cell at the same speed.

Moreover, the channels which are realized both in the lid and in the box by the molding process of thermoplastic material and with a co-injection of nitrogen, permit to obtain a battery container capable of completely revolutionizing the manufacturing stages concerning the construction of the battery including its charging and storing processes. In fact, with the container according to the invention, it is possible to obtain a first charge of the battery quickly and even on assembly line, because of the simplicity of the equipment necessary for the circulation of the electrolyte which now, thanks to the invention, is reduced to one single inlet tube for the inlet of the electrolyte and to one single outlet tube for the electrolyte which comes out of the battery after it has circulated in all the cells.

Finally, it can be observed that with the container obtained according to the instructions given by the invention, when the rechargings are carried out during the lifespan of the battery, it is possible to blow air through hole 6 and to suck air and fumes through opening 11, thus making the recharging faster.

I claim:

1. An accumulator container for receiving accumulator components therein formed of moldable plastic material adapted for rapid filling with a first charge of electrolyte, comprising:

a box; and a lid, the box having an outer wall and at least one intermediate partition forming one or more cells for receiving the accumulator components to be immersed in the electrolyte, each of said cells having at least one inlet tube for receiving the first charge of electrolyte, and the lid having channels for communicating with each inlet tube, each of said tubes being arranged in a substantially vertical orientation, having an upper end communicating with the corresponding channel in the lid and a lower end arranged near the bottom of the box, said lid having at least one first inlet opening for each channel, commonly connected to the channels for the distribution of the electrolyte, and a level tube for each cell, each level tube having an inlet communicating with an upper end of the corresponding channel and at least one second outlet opening formed therein and commonly connected with the level tubes.

2. A container according to claim 1, wherein the lid has a thickness and said inlet tubes, said level tubes and said channels are molded within the thickness of said lid.

3. A container according to claim 1, wherein the channels for distribution of the electrolyte in the lid define a substantially equal course, beginning from the common opening to each inlet tube, said course ensuring essentially the same charge losses.

4. A container according to claim 1 further comprising at least one receptacle having a lower end communicating with said level tubes for refilling said accumulator.

5. A container according to claim 1 wherein the inlet tubes and channels are formed by means of molding thermoplastic material with a coinjection of nitrogen.

6. A container according to claim 1 wherein each cell has a corner portion and the inlet tubes are located in correspondence with the corner portion of each cell formed by the wall of the box and by the intermediate partition dividing each cell from the next.

7. A container according to claim 6, wherein each inlet tube is adjacent to the inlet tube of the next cell.

8. A container according to claim 1 wherein the lid has a lateral surface and further comprising a header connecting the level tubes said header having at least one end communicating with the lateral surface of the lid through a hole therein, and a cap for closing said hole.

9. A accumulator container formed of a moldable plastic material adapted for rapid filling with a first charge of electrolyte comprising:

a box portion having external sidewalls, a bottom wall, and intermediate walls forming a plurality of cells therein, the box having an open top, each of said cells having integrally formed therein at least one inlet tube extending from the open top to near the bottom wall for receiving the first charge of electrolyte therethrough; and a lid having marginal portions for engaging the open top of the box, the lid having a plurality of inlet channels one each for communicating with each of said inlet tubes, and an inlet commonly coupled to the inlet channels for distribution of the electrolyte thereto, the lid further including an outlet tube for communicating with an upper portion of each cell and a header tube commonly connecting the outlet tubes with a common outlet therefor.

\* \* \* \* \*